(12) United States Patent
Bühn et al.

(10) Patent No.: US 11,976,714 B2
(45) Date of Patent: May 7, 2024

(54) GEAR UNIT INCLUDING A ROTATABLY MOUNTED TOOTHED PART, AND PROCESS FOR MANUFACTURING A GEAR UNIT INCLUDING A TOOTHED PART

(71) Applicant: SEW-EURODRIVE GMBH & CO. KG, Bruchsal (DE)

(72) Inventors: Oliver Bühn, Kraichtal (DE); Miki Tegeltija, Karlsdorf-Neuthardt (DE); Michael Josef Herberger, St. Leon-Rot (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 115 days.

(21) Appl. No.: 17/603,172

(22) PCT Filed: Mar. 10, 2020

(86) PCT No.: PCT/EP2020/025121
§ 371 (c)(1),
(2) Date: Oct. 12, 2021

(87) PCT Pub. No.: WO2020/207622
PCT Pub. Date: Oct. 15, 2020

(65) Prior Publication Data
US 2022/0196133 A1 Jun. 23, 2022

(30) Foreign Application Priority Data

Apr. 10, 2019 (DE) .......................... 102019002628.4

(51) Int. Cl.
| | |
|---|---|
| *F16H 55/08* | (2006.01) |
| *F16H 55/06* | (2006.01) |
| *F16H 55/17* | (2006.01) |

(52) U.S. Cl.
CPC .......... *F16H 55/0873* (2013.01); *F16H 55/06* (2013.01); *F16H 55/17* (2013.01); *F16H 2055/173* (2013.01)

(58) Field of Classification Search
CPC ........... F16H 55/0873; F16H 2055/173; F16H 55/17; F16H 1/145
See application file for complete search history.

(56) References Cited

U.S. PATENT DOCUMENTS

| 185,926 A | * | 1/1877 | Hunerwadel | ........... F16H 1/125 |
| | | | | 74/424.7 |
| 856,405 A | * | 6/1907 | Janson | .................... F16H 1/125 |
| | | | | 74/424.5 |

(Continued)

FOREIGN PATENT DOCUMENTS

| CN | 107725618 A | 2/2018 |
| DE | 1892456 U | 5/1964 |

(Continued)

OTHER PUBLICATIONS

Translation of DE 102004032552.*

(Continued)

*Primary Examiner* — Terence Boes
(74) *Attorney, Agent, or Firm* — Carter, DeLuca & Farrell LLP (57) ABSTRACT

In a gear unit that includes a rotatably mounted toothed part and a method for manufacturing a gear unit that includes a toothed part, the toothed part has bearing seats and a toothing, and the toothed part, e.g., together with the toothing, is produced from sintered metal powder. The toothed part is, for example, arranged as one piece, e.g., in an integral fashion.

36 Claims, 7 Drawing Sheets

(56) References Cited

U.S. PATENT DOCUMENTS

| | | | | |
|---|---|---|---|---|
| 879,679 | A | * | 2/1908 | Schmick .................. F16H 1/125 74/464 |
| 1,245,621 | A | * | 11/1917 | Schmick .................. F16H 1/125 74/424.5 |
| 1,748,813 | A | * | 2/1930 | Wildhaber .......... F16H 55/0853 74/459.5 |
| 2,954,704 | A | * | 10/1960 | Saari ................... F16H 55/0853 74/459.5 |
| 4,744,263 | A | * | 5/1988 | Kuiken ..................... F16H 1/12 74/462 |
| 5,288,556 | A | * | 2/1994 | Lemelson ............. C30B 25/105 428/408 |
| 6,128,969 | A | * | 10/2000 | Litvin ..................... F16H 1/125 74/462 |
| 9,812,923 | B2 | | 11/2017 | Searfoss |
| 9,964,180 | B2 | | 5/2018 | Hermes |
| 2007/0125148 | A1 | * | 6/2007 | Dohmann ................ B21K 1/30 72/352 |
| 2008/0264202 | A1 | * | 10/2008 | Mineshima ............. F16H 1/145 74/606 R |
| 2013/0042711 | A1 | * | 2/2013 | Napau .................... F16H 1/145 74/417 |
| 2013/0068057 | A1 | | 3/2013 | Grosskopf |
| 2021/0317904 | A1 | * | 10/2021 | Ikebukuro .............. A01K 89/01 |

FOREIGN PATENT DOCUMENTS

| | | | |
|---|---|---|---|
| DE | 4021024 A1 | 6/1991 | |
| DE | 102004032552 A1 | 2/2006 | |
| GB | 2234034 A * | 1/1991 | .......... B23D 49/162 |
| JP | 2006281264 A | 10/2006 | |
| WO | 2015/022042 A1 | 2/2015 | |

OTHER PUBLICATIONS

International Search Report issued in corresponding International Application No. PCT/EP2020/025121, dated Apr. 15, 2020, pp. 1-2, English Translation.

EP Office Action issued in corresponding EP Patent Application No. 20711791.2, dated Nov. 2, 2023, with English Translation.

\* cited by examiner

GEAR UNIT INCLUDING A ROTATABLY MOUNTED TOOTHED PART, AND PROCESS FOR MANUFACTURING A GEAR UNIT INCLUDING A TOOTHED PART

FIELD OF THE INVENTION

The present invention relates to a gear unit having a rotatably mounted toothed part and to a method for manufacturing a gear unit having a toothed part.

BACKGROUND INFORMATION

In certain conventional systems, e.g., the Fischertechnik toy, a gear unit has toothed parts that are connected to a shaft in a torsionally fixed manner.

U.S. Patent Application Publication No. 2013/0068057 describes a gear unit for a generator.

German Patent Document No. 1 892 456 describes a toothed blank, which is made from compressed sintered material.

German Patent Document No. 40 21 024 describes a drive transmission for auxiliary units.

Japanese Patent Document No. 2006-281 264 describes a production method for a gear unit.

SUMMARY

Example embodiments of the present invention provide a gear unit having a compact configuration and thus, for example, allows for the transmission of high torque in a small volume.

According to an example embodiment of the present invention, a gear unit is provided with a rotatably mounted toothed part, the toothed part having bearing seats and a toothing. The toothed part, e.g., together with the toothing, is produced from sintered metal powder, and the toothed part, for example, is arranged as one piece, e.g., in an integral fashion.

This offers the advantage that the toothed part together with the shaft is readily manufactured and economical to manufacture. The toothed part thus already has bearing seats on its own. Because the toothed part is made from metal, the carrying capacity is very high. No machining of the toothed part is required because it is formatively produced during the sintering operation.

According to example embodiments, the toothing is situated axially between the two bearing seats. This has the advantage that the toothed part is mounted on both sides.

According to example embodiments, the toothing has a first chamfer area at its outer edge in the radial direction, and at each circumferential position, especially at each circumferential angular position, the first chamfer area, for example, has an angle amount in relation to the axial direction that ranges from 10° to 30°, e.g., from 15° to 25°. This has the advantage that the toothing is beveled at the radially inner and radially outer edge. An especially satisfactory quality is achievable at 15° to 25°, for example.

According to example embodiments, the toothing has a second chamfer area at its inner edge in the radial direction, and at each circumferential position, e.g., at each circumferential angular position, the second chamfer area, for example, has an angle amount in relation to the axial direction that ranges from 10° to 30°, e.g., from 15° to 25°. This has the advantage that the toothing is beveled at the radially inner and the radially outer edge. A particularly satisfactory quality is achievable at 15° to 25°, for example.

According to example embodiments, the first cone shell surface encompasses the first chamfer area, and a second cone shell surface encompasses the second chamfer area, the sectional construct of the first chamfer area with the second chamfer area being situated on the side of the toothed part facing the plane toothing, and/or the sectional construct of the first chamfer area with the second chamfer area being situated closer to the respective top of the teeth of the toothing than to the respective base of the teeth of the toothing, the cone tip of the cone of the first cone shell surface, e.g., being situated on the center axis, the axis of rotational symmetry, and/or the axis of rotation of the toothed part, the cone tip of the cone of the second cone shell surface, e.g., being situated on the center axis, the axis of rotational symmetry, and/or the axis of rotation of the toothed part, and the sectional construct, for example, being a circle whose center point is situated on the center axis, the axis of rotational symmetry, and/or the axis of rotation of the toothed part. This offers the advantage that the toothing is beveled at the inner and outer edge and a removal from the mold is therefore easy to perform. However, the running surface for the toothing is reduced as a result.

According to example embodiments, the opening angle of the cone of the first cone shell surface amounts to between 20° and 60°, e.g., between 30° and 50°, and the opening angle of the cone of the second cone shell surface amounts to between 20° and 60°, e.g., between 30° and 50°. This has the advantage that a sufficiently large draft is provided at the inner and outer edge during the removal from the mold, which means that the unmolding is ensured without any loss of quality.

According to example embodiments, the toothing is a plane toothing, e.g., on an axial end face of a radially protruding region of the toothed part. This has the advantage that the toothing is able to be configured as a toothing of a ring gear such as a Spiroplan wheel or a hypoid wheel.

According to example embodiments, a transition region, e.g., a curved region, is situated between the region covered by the toothing in the axial direction, i.e., for example, between the axial region covered by the toothing, and the region covered by a first one of the two bearing seats in the axial direction, i.e., for example, the axial region covered by a first one of the two bearing seats, the outer radius measured in the radial direction and/or the diameter increasing in a strictly monotonic and continuously differentiable manner, e.g., smoothly, with decreasing distance from the toothing. This offers the advantage that the notching effect is reduced, especially in the particular region in which torque is transmitted from the toothing to the bearing seat region.

According to example embodiments, the transition area axially abuts the axial region covered by the toothing. This has the advantage that the torque transmission is able to be obtained with a reduced notching effect.

According to example embodiments, each tooth of the plane toothing has an arched configuration, and thus, e.g., an increasing circumferential angle with an increasing radial distance. The tooth thickness of each tooth of the toothing initially increases with increasing radial distance and then decreases, the increase being implemented strictly monotonically and the decrease likewise being implemented strictly monotonically. This offers the advantage that each tooth has a draft in the direction of the flank line when the toothed part is removed from the mold following the sintering operation, which allows for a safe, high-quality removal from the mold. In addition, the tooth has a corresponding configuration also in the profile direction, e.g., transversely to the arched configuration, in order to provide such a mold removal. To this end, the tooth thickness decreases strictly monotonically in the axial direction or in other words, from the base to the top of the tooth.

According to example embodiments, the radial clearance region covered by the transition region is set apart from the radial clearance region covered by the toothing, and especially is smaller than the radial clearance region covered by the toothing. This offers the advantage that the load-bearing material of the toothed part is able to be kept to a minimum.

According to example embodiments, at its end facing away from the toothing, the transition region transitions to a first region of the toothed part in a continuously differentiable manner. The radius measured in the radial direction and/or the diameter of the toothed part in the first region increases monotonically, but especially not strictly monotonically, e.g., in a stepped manner, from an axial end of the toothed part with decreasing distance from the toothing. This has the advantage that the notching effect is able to be kept to a minimum.

According to example embodiments, a shim washer rests against a step of the toothed part, which is axially set apart from the toothing and disposed on the side of the toothing axially facing away from the transition region, the shim washer being situated axially between the step and an inner ring of a bearing accommodated on the first bearing seat of the toothed part, the shim washer, e.g., touching the inner ring. This has the advantage that the toothing play is adjustable with the aid of the shim washer arranged as one piece or in multiple pieces, e.g., the axial position of the toothing relative to a pinion of the gear unit meshes with the toothing. In addition, the adjustment of the toothing play and/or the bearing tension on the rotating part is able to be obtained. Thus, the shim washer is to be placed on the toothed part during the assembly and the toothing play, the bearing play, and/or the bearing tension is/are to be set in this manner. The related increase in the moment of inertia has the advantage of reducing fluctuations in the rotational speed.

According to example embodiments, the toothed part has a rotationally symmetric configuration, and the toothed part, with the exception of the toothing, has a continuous rotational symmetry, for example. For example, the toothing has a discrete rotational symmetry, which especially corresponds to the number of teeth of the toothing or whose number of symmetry rotation axes is similar to the number of teeth of the toothing. This offers the advantage that the higher moments of the inertia tensor of the toothed part are able to be reduced, ideally to zero.

According to example embodiments, the toothing of the toothed part is in engagement with the toothing of a metallic, non-sintered further toothed part. This has the advantage that the toothed part, which has a roughness according to the sintered production type, is in engagement with a smooth metallic, further toothed part and thus produces less abrasive wear, or in other words, achieves a long service life. Although it is also possible and more cost-effective to produce the further toothed part from sintered metal powder as well, the service life would be shorter than when using the less rough metallic and finely finished additional toothed part.

However, if the further toothed part is produced from sintered metal powder, a post-treatment of the toothing with the aid of a laser is advantageous because this produces a surface in the toothing that has even less roughness.

According to example embodiments, a shaft sealing ring seat is situated on the side of the second bearing seat facing away from the toothing, the shaft sealing ring seat, e.g., being formatively machined, e.g., by rolling, e.g., with the aid of rollers. This has the advantage that a high degree of protection is achievable, especially sealing, e.g., between the interior space of the gear unit and the environment.

According to an example embodiment of the present invention, in a method for manufacturing a previously mentioned gear unit, the toothed part is produced only by sintering of a metal powder, and thus, for example, no milling post-machining is performed, e.g., of the toothing and/or the bearing seats.

This offers the advantage that a simple and fast manufacture of an extremely robust toothed part having a high load-carrying capacity is achievable, e.g., in comparison with plastic injection-molded parts.

According to example embodiments, a further toothed part, which is produced from sintered metal powder and whose toothing is smoothed by a laser post-treatment following the sintering operation is brought into engagement with the toothed part. This offers the advantage that the wear of the sintered toothed part is reduced because it is in engagement with the further, smoothed toothed part.

Further features and aspects of example embodiments of the present invention are described in greater detail below with reference to the appended schematic Figures.

DETAILED DESCRIPTION

Figure 1:
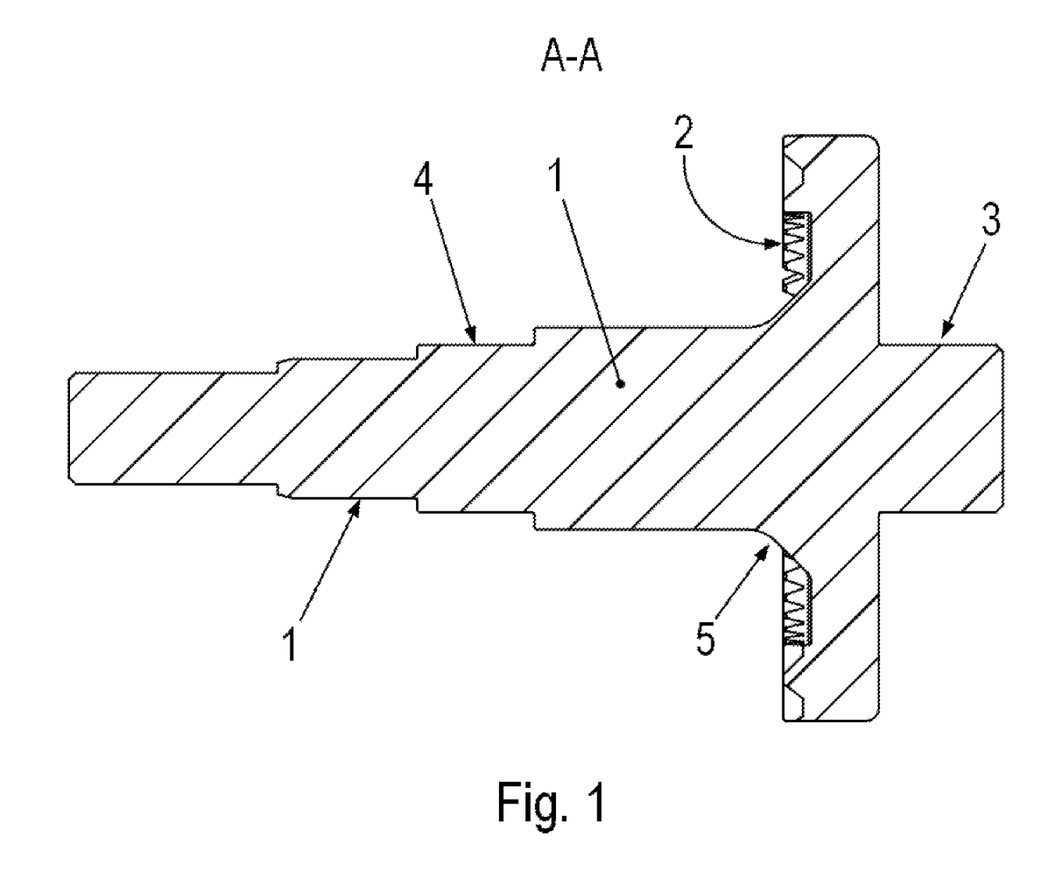
FIG. 1 is a schematic longitudinal cross-sectional view through a toothed part 1 according to an example embodiment of the present invention.
Figure 2:
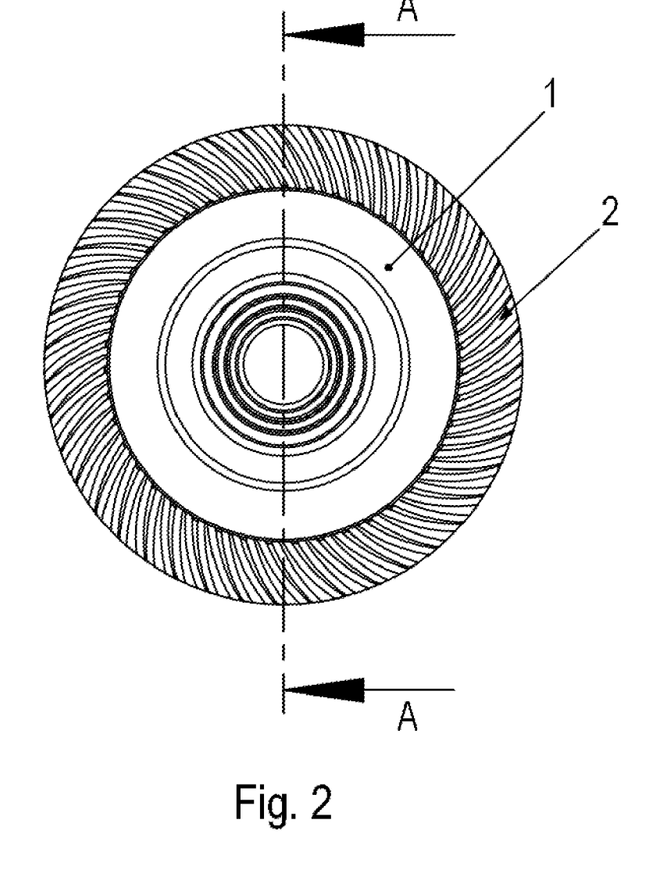
FIG. 2 is a schematic view of toothed part 1 in an axial direction.
Figure 3:
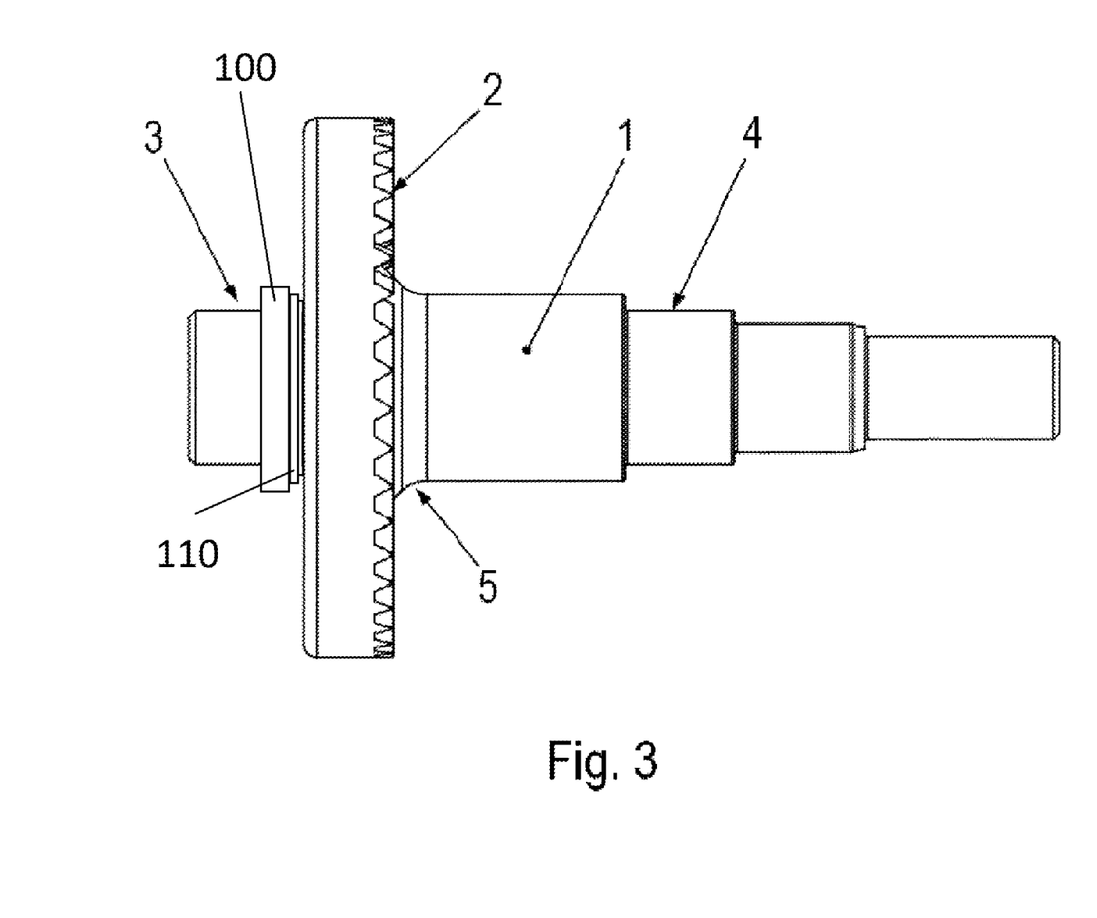
FIG. 3 is a schematic side view of toothed part 1.

As schematically illustrated in FIGS. 1 through 3, the toothed part has a plane toothing 2. This toothing is situated in a radially protruding region of toothed part 1.

With the exception of toothing 2, toothed part 1 is arranged as a rotating body.

The axial direction is the axis of rotation of the rotating body.

A separate bearing seat (3, 4) is situated axially on both sides of the radially protruding region.

A bearing, e.g., the inner ring of a bearing, is able to be placed on each one of the bearing seats (3, 4), the associated outer ring of the respective bearing being able to be accommodated in the housing of the gear unit.

Toothed part 1 is therefore arranged as one piece and mounted in the housing of the gear unit.

The shaft diameter increases monotonically, e.g., in a stepped, monotonic manner, from the first axial end region of toothed part 1 to the radially protruding region of toothed part 1.

From the other axial end region of toothed part 1, the shaft diameter also increases monotonically, e.g., in a stepped, monotonic manner.

The radially protruding region has a curvature 5 on the side of toothing 2. At the curvature, the shaft diameter increases monotonically in the axial direction in a continuously differentiable and strictly monotonic and thus smooth manner, for example. Situated next to this axial region covered by curvature 5 is a step, e.g., an axial region having a constant shaft diameter, this shaft diameter, for example, being the maximum shaft diameter of toothed part 1.

The shaft diameter is the maximum diameter measured in the radial direction in each case.

The radial clearance region covered by curvature 5 is set apart from the radial clearance region covered by toothing 2 and, for example, is smaller than the radial clearance region covered by toothing 2.

The radial clearance region covered by toothing 2 is restricted by the shaft diameter of the axial region having a constant shaft diameter.

The axial region having the constant shaft diameter encompasses the axial region covered by the toothing.

Toothed part 1 is produced from sintered metal powder. Steel is, for example, used as the metal in this case.

Toothed part 1 thus has the form of a cylindrical, plane-toothed perforated disk through whose centrally situated recess, e.g., hole, a shaft projects which has shaft steps. In addition, however, curvature 5 has been added on the side of the perforated disk having the plane toothing.

Toothing 2 is, for example, arranged as a Spiroplan toothing or a hypoid toothing.

Since the shaft diameter increases in a stepwise manner from bearing seat 3 in the direction of the radially protruding region, the shim washer is able to be placed against this step.

For the axial positioning of the bearing mounted on bearing seat 4, a shim washer 110, i.e., a perforated disk, is placed on toothed part 1. The shim washer 110 rests against the step of the radially protruding region. The height of the inner diameter of the shim washer 110 is greater than the shaft diameter in the region covered by bearing seat 3.

The shim washer 110 is thus situated between the radially protruding region and the inner ring of the bearing 100. In other words, the shim washer 110 rests against the inner ring of the bearing 100 and allows for the axial positioning from the direction of rotating toothed part 1, although the moment of inertia of the rotating part is greater as a result. For example, the outer ring of the bearing is therefore able to be placed directly against a step of the housing part.

Since toothed part 1 can be produced by sintering in a mold, the toothing does not require any machining.

In the same manner, machining of bearing seats 3 and 4 is able to be omitted.

However, sealing between the interior of the gear unit and the environment may be provided. For this purpose, a shaft sealing ring seat 6 is disposed on the side of bearing seat 4 facing away from the toothing. The interior space of the gear unit can therefore be sealed from the environment with the aid of a shaft sealing ring provided there. In order to produce tightness, formative post-machining of the shaft sealing ring is necessary. This is because sealing is possible only if a negligibly low roughness is provided at shaft sealing ring seat 6. Rolling, e.g., machining with the aid of rollers, is, for example, provided for the formative post-machining, and recesses, e.g., centering bores, are provided for the centered retaining of toothed part 1 on mandrels of the processing machinery, which are centrally situated at the axially front and axially rear end region of toothed part 1 and axially point into the toothed part.

A recess in the shape of a truncated circular cone and/or a frustoconical shape may be centrally introduced in toothed part 1. The axis of rotational symmetry of the truncated cone thus is the axis of rotation of toothed part 1.

The axial region covered by the recess includes the axial region covered by the radially protruding region, i.e., for example, that of the perforated disk.

The recess terminates in the environment and extends within the toothed part through the axial region covered by toothing 2. The moment of inertia is therefore reduced, e.g., to a greater extent than corresponds to the increase by the shin washer.

The recess allows for a thin-walled configuration of toothed part 1 since no keyed connection is required between the toothed region and the stepped shaft.

Figure 4:
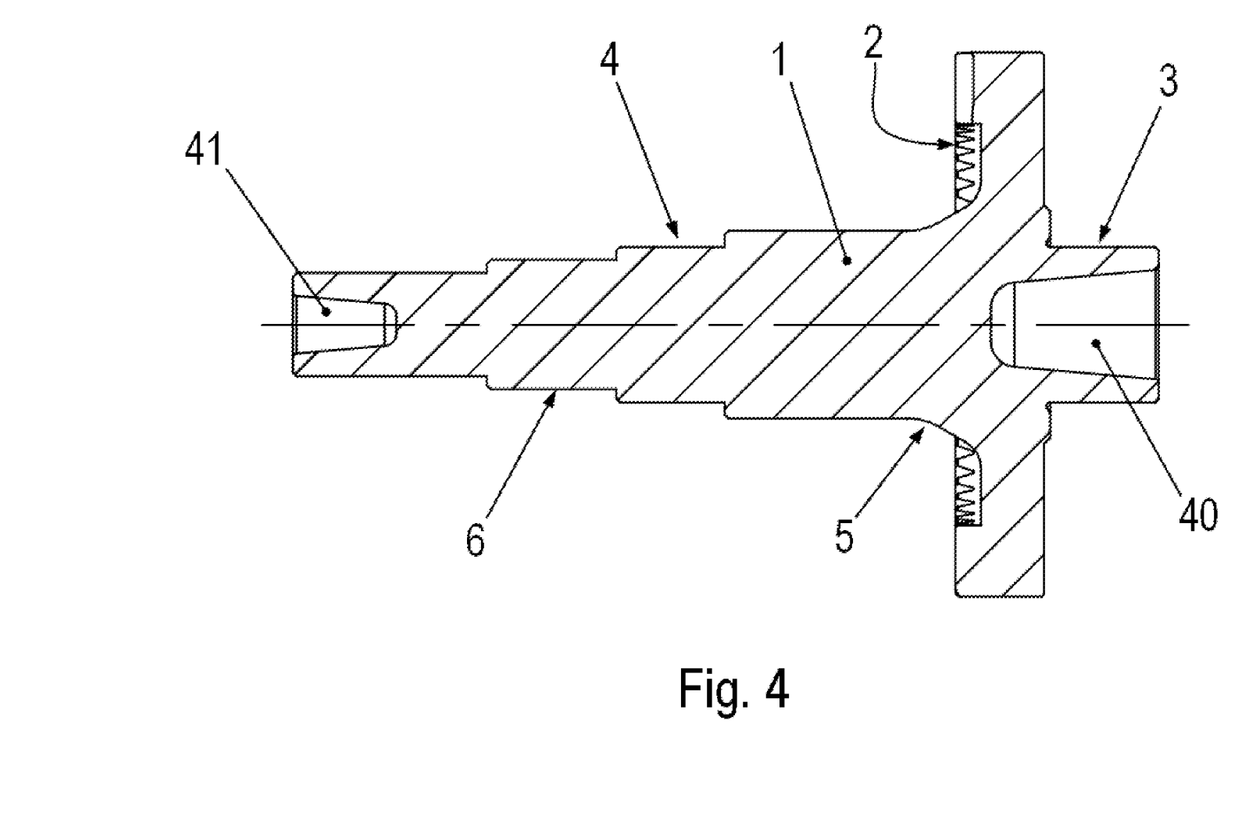
FIG. 4 is a schematic longitudinal cross-sectional view through a further toothed part 1 according to an example embodiment of the present invention, which has receptacles for mandrels of a processing machine.

FIG. 4 illustrates an exemplary embodiment that has a similar configuration, in which the axial region covered by the recess does not encompass but only overlaps with the axial region covered by the radially protruding region, e.g., especially the region of the perforated disk.

Figure 5:
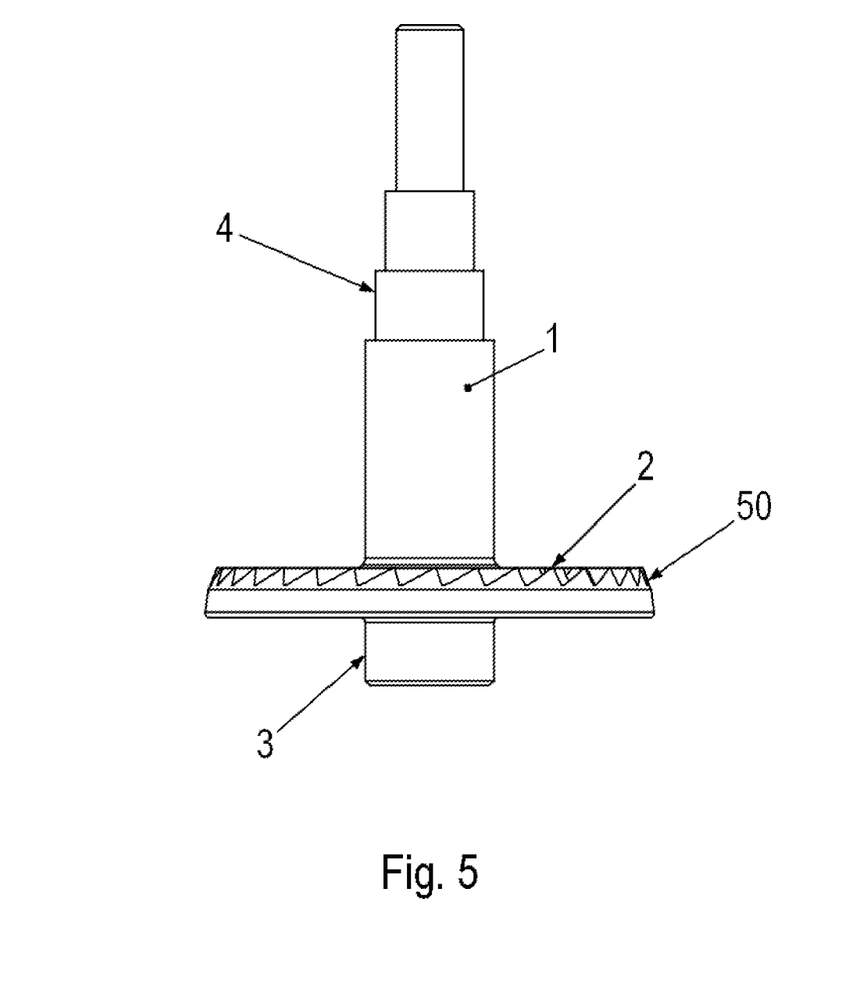
FIG. 5 is a schematic side view of a further toothed part 1 according to an example embodiment of the present invention in which a chamfer area 50 is illustrated at the radially outer edge of toothing 2 of the toothed part.
Figure 6:
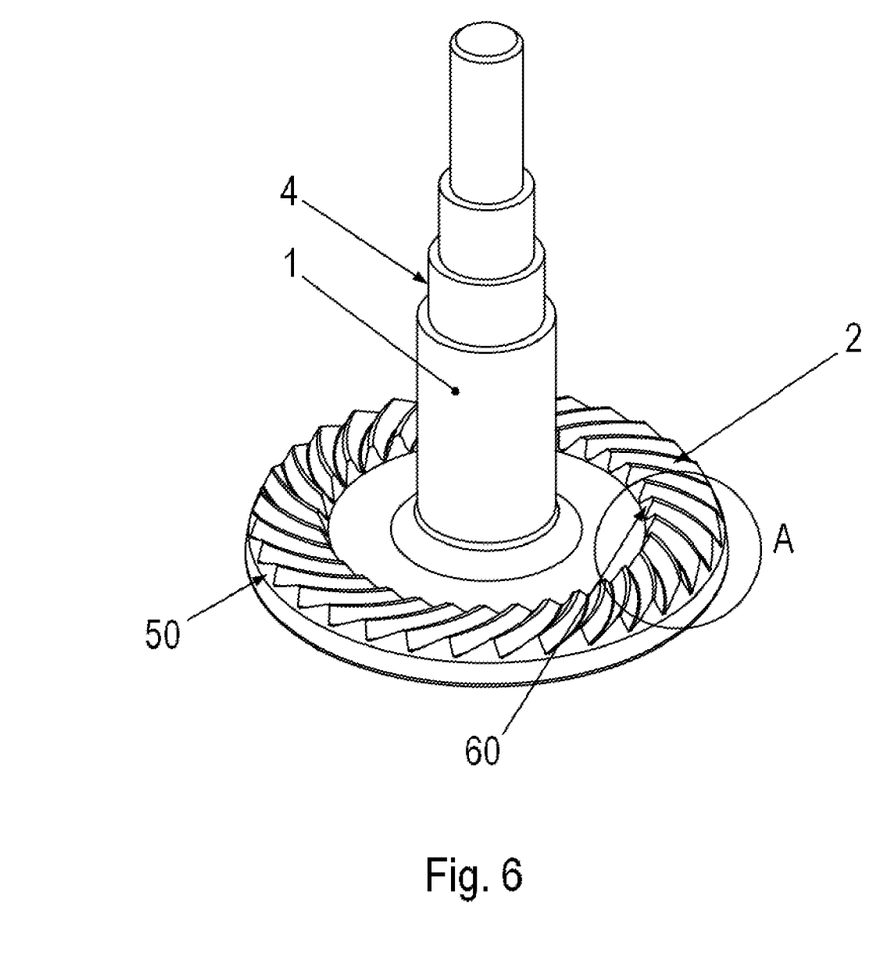
FIG. 6 is a schematic perspective view of toothed part 1 associated with FIG. 5, in which a chamfer area 60 is visible also at the radially inner edge of toothing 2.
Figure 7:
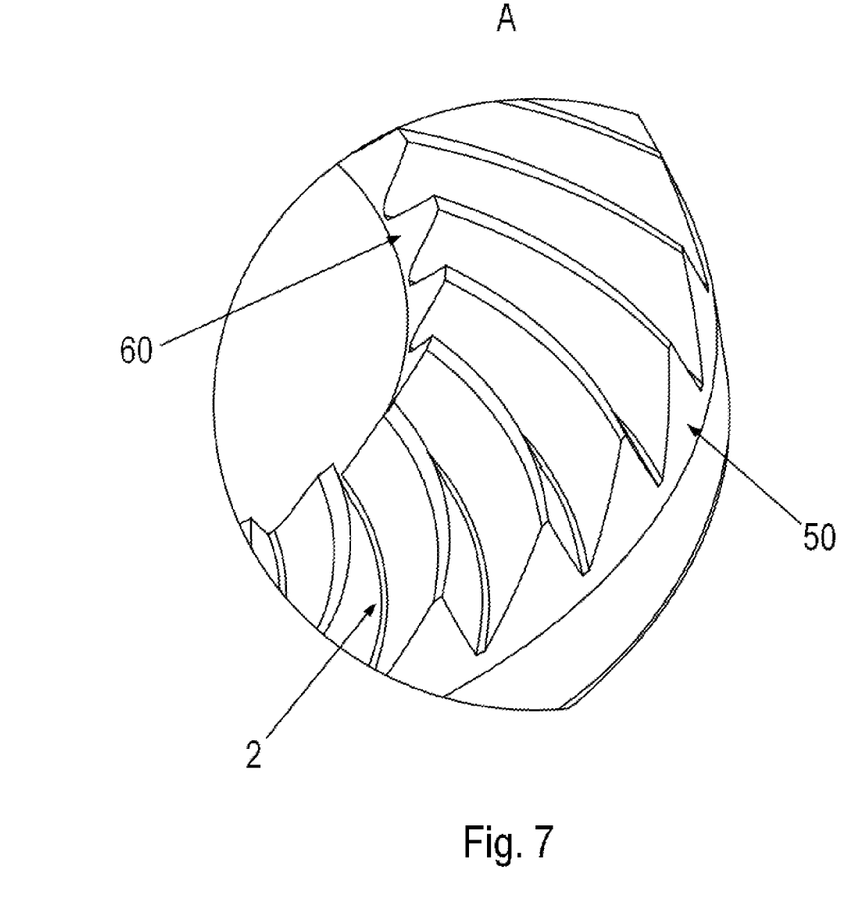
FIG. 7 schematically illustrates an enlarged region of FIG. 6.

As illustrated in FIGS. 5 through 7, a particularly advantageously shaped toothing 2 has a second chamfer area 60 at its radially inner edge and a first chamfer area 50 at its radially outer edge. Both chamfer areas are subregions of a shell surface of a respective cone whose opening angle amounts to between 20° and 60°. However, an especially good production quality is achievable at an opening angle of between 30° and 50°.

The cross-sectional area of the two cones is a circle which is situated closer to the tops of the teeth of toothing 2 than to the bases of the teeth of toothing 2. The center point of the circle is situated on the axis of symmetry of toothed part 1. Toothed part 1 has a discrete N-fold rotational symmetry about the axis of symmetry, N being the number of teeth of the plane toothing.

LIST OF REFERENCE NUMERALS 1 toothed part
2 toothing
3 bearing seat
4 bearing seat
5 curvature
6 shaft sealing ring seat

The invention claimed is:

1. A gear unit, comprising:
  a rotatably mounted toothed part including bearing seats and a toothing, the toothed part being formed of sintered metal powder;
  wherein the toothing is arranged as a plane toothing;
  wherein the toothing has a first chamfer area at an outer edge in a radial direction; and
  wherein at each circumferential position and/or at each circumferential angular position, the first chamfer area has an angle amount in relation to an axial direction between 10° and 30° and/or between 15° and 25°.

2. A gear unit, comprising:
  a rotatably mounted toothed part including bearing seats and a toothing, the toothed part being formed of sintered metal powder;
  wherein the toothing is arranged as a plane toothing;
  wherein the toothing has a first chamfer area at an outer edge in a radial direction; and wherein the toothing has a second chamfer area at a radially inner edge in the radial direction.

3. The gear unit according to claim 2, wherein the toothed part and the toothing are formed of sintered metal powder.

4. The gear unit according to claim 2, wherein the toothed part is arranged as a single piece.

5. The gear unit according to claim 2, wherein the toothing is arranged axially between two bearing seats.

6. The gear unit according to claim 2, wherein at each circumferential position and/or at each circumferential angular position, the second chamfer area has an angle amount in relation to an axial position between 10° and 30° and/or between 15° and 25°.

7. The gear unit according to claim 2, wherein a first cone shell surface includes the first chamfer area, a second cone shell surface includes the second chamfer area, a sectional construct of the first chamfer area with the second chamfer area is situated on a side of the toothed part facing a plane toothing, and/or the sectional construct of the first chamfer area with the second chamfer area is situated closer to a respective top of teeth of the toothing than to a respective base of teeth of the toothing.

8. The gear unit according to claim 7, wherein a cone tip of a cone of the first cone shell surface is arranged on a center axis, an axis of rotational symmetry, and/or an axis of rotation of the toothed part.

9. The gear unit according to claim 7, wherein a cone tip of a cone of the second cone shell surface is arranged on a center axis, an axis of rotational symmetry, and/or an axis of rotation of the toothed part.

10. The gear unit according to claim 7, wherein the sectional construct is a circle having center point arranged on a center axis, an axis of rotational symmetry, and/or an axis of rotation of the toothed part.

11. The gear unit according to claim 2, wherein an opening angle of a cone of the first cone shell area is between 20° and 60° and/or between 30° and 50°, and an opening angle of a cone of the second cone shell area is between 20° and 60° and/or between 30° and 50°.

12. The gear unit according to claim 2, wherein the toothing is arranged as a plane toothing on an axial end face of a radially protruding region of the toothed part, and, disregarding the toothing, a normal direction of the planar axial end face is aligned in parallel with an axis of rotation of the toothed part.

13. The gear unit according to claim 2, wherein each tooth of the plane toothing has an arched configuration and an increasing circumferential angle with increasing radial distance, and a tooth thickness of each tooth initially increases with an increasing radial distance and then decreases.

14. The gear unit according to claim 2, wherein a transition region is arranged between a region covered by the toothing in an axial direction, an outer radius measured in a radial direction and/or a diameter increasing in a strictly monotonic and continuously differentiable manner with decreasing distance from the toothing.

15. The gear unit according to claim 14, wherein the transition region includes a curved region.

16. The gear unit according to claim 14, wherein a transition region is arranged between an axial region covered by the toothing and a region covered by a first one of the bearing seats in the axial direction and/or an axial region covered by the first one of the bearing seats.

17. The gear unit according to claim 14, wherein the transition region axially abuts an axial region covered by the toothing and/or a radial clearance region covered by the transition region is set apart from and/or is smaller than a radial clearance region covered by the toothing.

18. The gear unit according to claim 14, wherein at an end facing away from the toothing, the transition region transitions to a first region of the toothed part in a continuously differentiable manner, a radius measured in a radial direction and/or a diameter of the toothed part in the first region increasing from an axial end of the toothed part in a monotonic but not strictly monotonic manner with decreasing distance from the toothing.

19. The gear unit according to claim 2, wherein a transition region is arranged between a region covered by the toothing in an axial direction, an outer radius measured in a radial direction and/or a diameter increasing in a strictly monotonic and continuously differentiable manner and smoothly with decreasing distance from the toothing.

20. A gear unit, comprising:
a rotatably mounted toothed part including bearing seats and a toothing, the toothed part being formed of sintered metal powder;
wherein the toothing is arranged as a plane toothing;
wherein a transition region is arranged between a region covered by the toothing in an axial direction, an outer radius measured in a radial direction and/or a diameter increasing in a strictly monotonic and continuously differentiable manner with decreasing distance from the toothing; and
wherein resting against a step of the toothed part, axially set apart from the toothing and disposed on a side of the toothing axially facing away from the transition area, is a shim washer arranged axially between the step and an inner ring of a bearing, the shim washer contacting the inner ring.

21. The gear unit according to claim 2, wherein the toothed part is rotationally symmetric and, except for the toothing, has a continuous rotational symmetry in relation to the axis of rotation of the toothed part.

22. The gear unit according to claim 21, wherein the toothing has a discrete rotational symmetry, which corresponds to a number of teeth of the toothing or having a number of symmetry rotation axes similar to the number of teeth of the toothing.

23. The gear unit according to claim 2, wherein the toothing of the toothed part is in engagement with a toothing of a metallic, non-sintered further toothed part.

24. The gear unit according to claim 23, wherein the toothing of the toothed part and/or of the further toothed part is postprocessed by a laser and/or thermally smoothed at a surface.

25. A gear unit, comprising:
a rotatably mounted toothed part including bearing seats and a toothing, the toothed part being formed of sintered metal powder;
wherein the toothing is arranged as a plane toothing; and
wherein a shaft sealing ring seat is arranged on a side of a second bearing seat facing away from the toothing.

26. The gear unit according to claim 25, wherein the shaft sealing ring seat is formatively machined by rolling with the aid of rollers.

27. The gear unit according to claim 2, wherein the toothed part is arranged as a solid shaft.

28. The gear unit according to claim 2, wherein a radial distance range of the toothed part, relative to an axis of rotation of the toothed part, is greater than a radial distance range, relative to the axis of rotation of the toothed part, of at least one of the bearing seats.

29. The gear unit according to claim 2, wherein the toothed part has an axially extending, frustoconical recess that is rotationally symmetric with respect to an axis of rotation of the toothed part, an axial region covered by the recess includes or overlaps with a region covered by a radially protruding region in the axial direction.

30. The gear unit according to claim 29, wherein the recess terminates in the environment and extends within the toothed part through a region covered by the toothing in an axial direction.

31. A method for manufacturing a gear unit as recited in claim 2, comprising:
producing the toothed part by and/or only by sintering a metal powder.

32. The method according to claim 31, wherein no cutting post-machining is performed on the toothed part, the toothing, or the bearing seats.

33. The method according to claim 31, wherein only a shaft sealing ring seat is formatively machined.

34. The method according to claim 33, wherein the shaft sealing ring is formatively machined by rolling and/or with the aid of rollers.

35. The method according to claim 31, wherein a further toothed part is produced from sintered metal powder, a toothing of the further toothed part is smoothed by a laser postprocessing following the sintering, and the further toothed part is brought into engagement with the toothed part.

36. The gear unit according to claim 2, wherein a first one of the bearing seats is arranged on a first axial side of the toothing, and a second one of the bearing seats is arranged on a second axial side of the toothing opposite the first axial side.

* * * * *